United States Patent [19]
Bestmann

[11] Patent Number: 5,678,954
[45] Date of Patent: *Oct. 21, 1997

[54] ECOLOGICAL COIR ROLL ELEMENT AND SHORELINE PROTECTED THEREBY

[76] Inventor: Lothar Bestmann, Pinneberger, Strasse 203, D-2000 Wedel/Holst, Germany

[*] Notice: The term of this patent shall not extend beyond the expiration date of Pat. No. 5,425,597.

[21] Appl. No.: 448,680

[22] Filed: May 24, 1995

Related U.S. Application Data

[60] Continuation of Ser. No. 225,584, May 10, 1994, Pat. No. 5,425,597, which is a division of Ser. No. 43,272, Apr. 6, 1993, Pat. No. 5,338,131, which is a continuation-in-part of Ser. No. 886,693, May 21, 1992, abandoned.

[30] Foreign Application Priority Data

Mar. 24, 1992 [EP] European Pat. Off. .............. 92105015

[51] Int. Cl.$^6$ .................................................. F02B 3/12
[52] U.S. Cl. ........................... 405/24; 405/16; 405/21
[58] Field of Search .......................... 405/16, 15, 21, 405/24, 31–35; 47/665

[56] References Cited

U.S. PATENT DOCUMENTS

| | | | |
|---|---|---|---|
| 486,887 | 11/1892 | Neale | 405/16 |
| 855,584 | 6/1907 | Neale | 405/16 |
| 909,423 | 1/1909 | Keller | 405/16 |
| 2,201,279 | 5/1940 | Willing | 405/16 |
| 2,264,973 | 12/1941 | Guarino | 47/66 S X |
| 4,002,034 | 1/1977 | Muhring et al. | 405/19 |

FOREIGN PATENT DOCUMENTS

39173577  5/1989  Germany.

OTHER PUBLICATIONS

Bestmann, Lothar, *Water and Soil*, "Praktische Verwendung lebender Baustoffe und technische Moglichkeiten", Year 36, vol. 1, Jan., 1984.

Hoeger, Sven, *Soil and Water Conservation*, "Schwimmkampen–Germany's artificial floating islands", vol. 43, No. 4, Jul.–Aug., 1988, pp. 304–306.

Bestmann, Lothar, outline of presentatioin to U.S. Army Corps of Engineers, Lake Eufula, OK, Apr., 1990.

Bestmann, Lothar, "Biological Engineering Methods of Shore Protection", Apr., 1991.

Bestmann Green Systems, "Bioengineering for Erosion Control, Water Quality, and Habitat Restoration", Feb., 1992.

Bestmann Green Systems, "Bioengineering with Bestmann Green Systems", Mar., 1992.

Goldsmith, Wendi, *Land and Water*, "Working with Nature to Stabilize Shorelines", Nov./Dec., 1991.

*Primary Examiner*—Dennis L. Taylor
*Attorney, Agent, or Firm*—Richard P. Crowley

[57] ABSTRACT

An ecological fiber roll element for use in protecting a shoreline to prevent erosion and to the protected shoreline. The roll element comprises a generally cylindrical roll, with or without aquatic plants therein, the roll element consisting essentially of coir material. The roll element includes a netting material about the exterior surface of the roll. A plurality of the roll elements are arranged on a shoreline and secured usually by stakes to the shoreline.

27 Claims, 8 Drawing Sheets

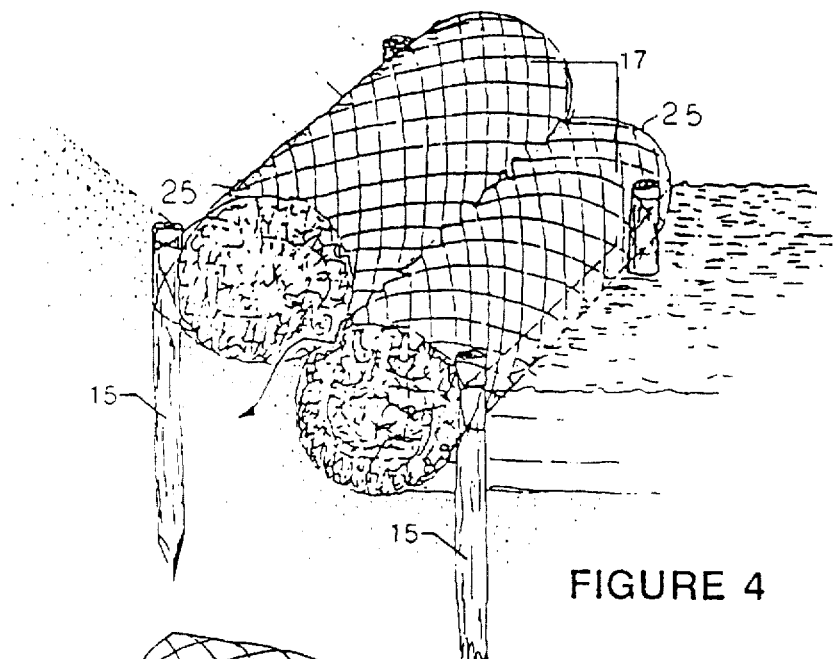
FIGURE 4
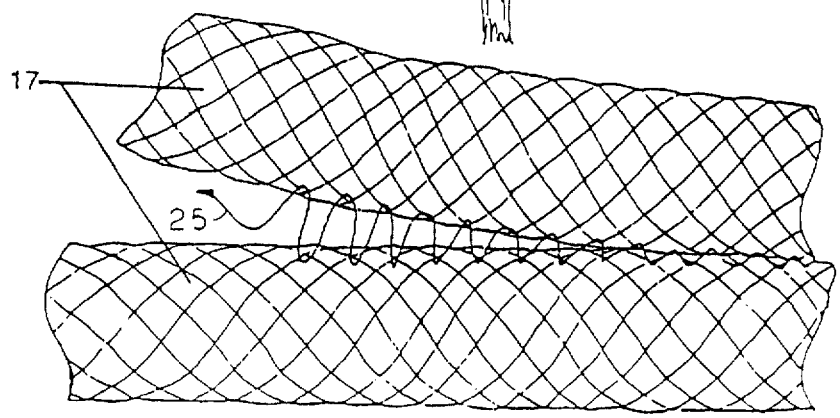
FIGURE 5
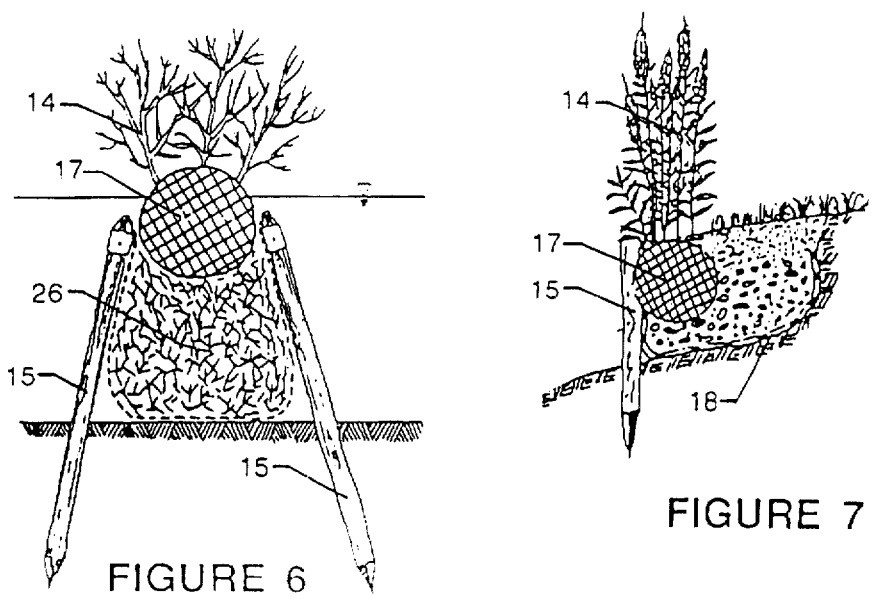
FIGURE 6
FIGURE 7

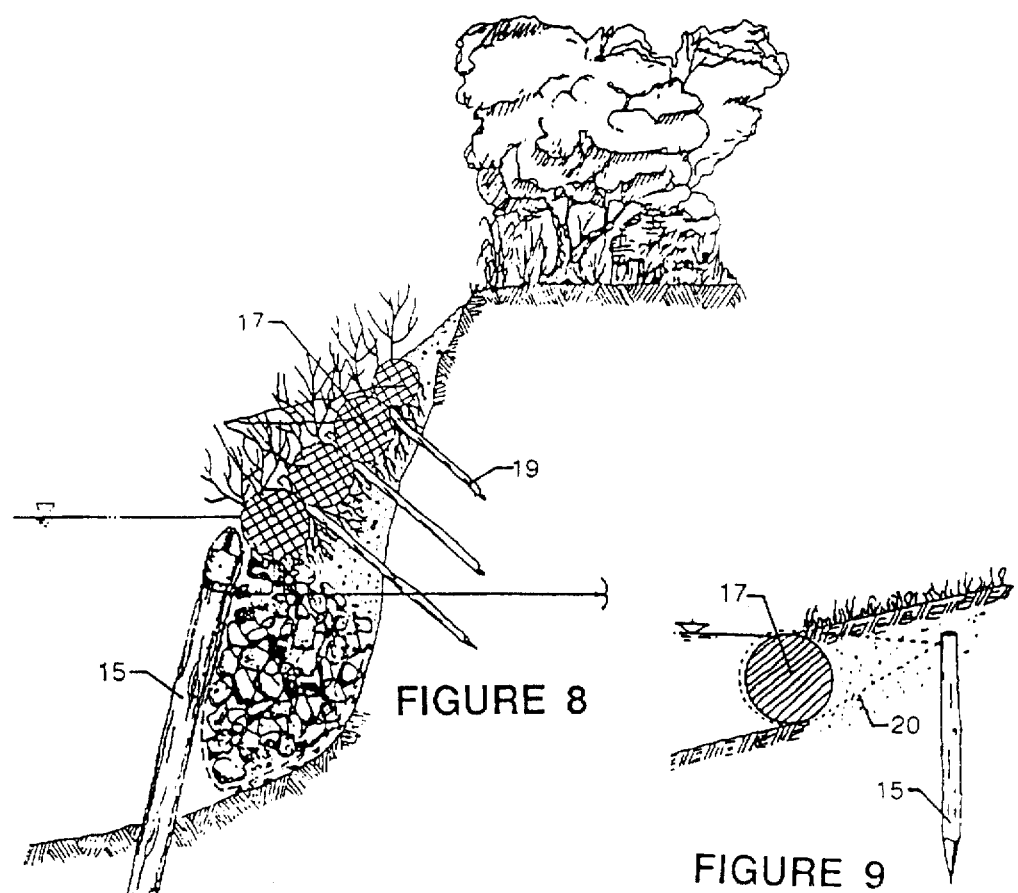
FIGURE 8
FIGURE 9
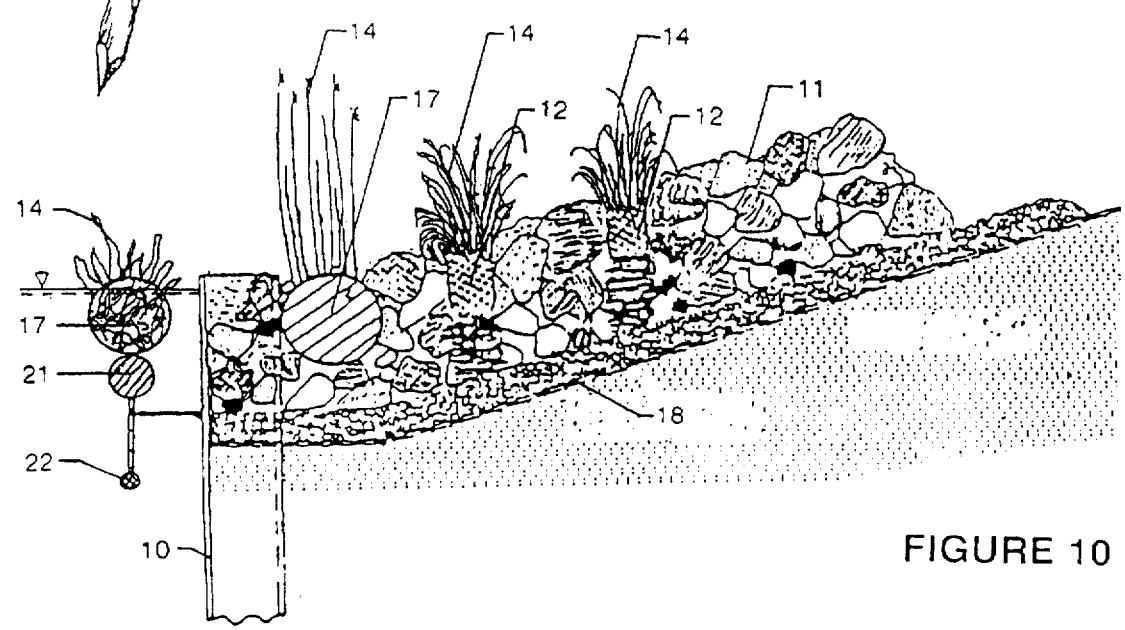
FIGURE 10

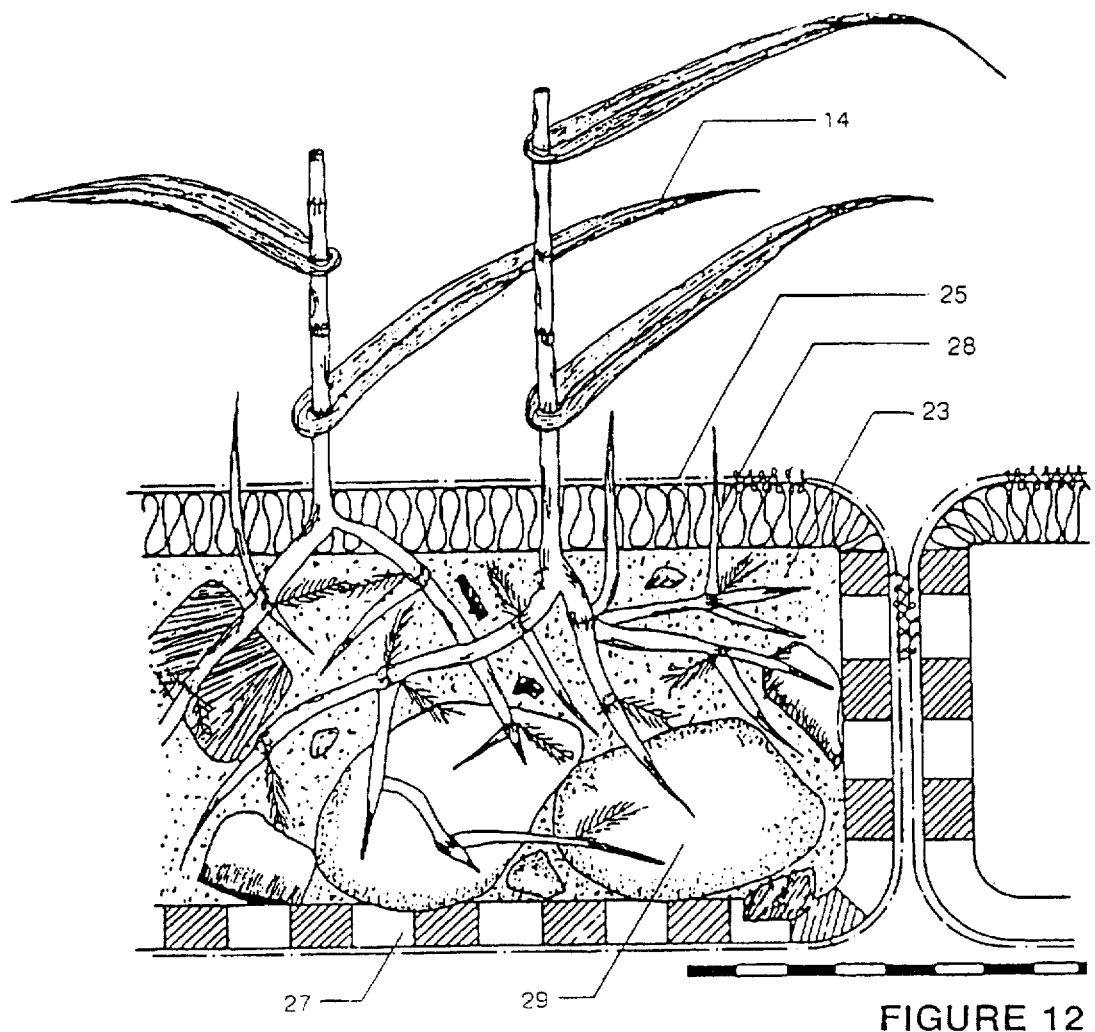
FIGURE 12
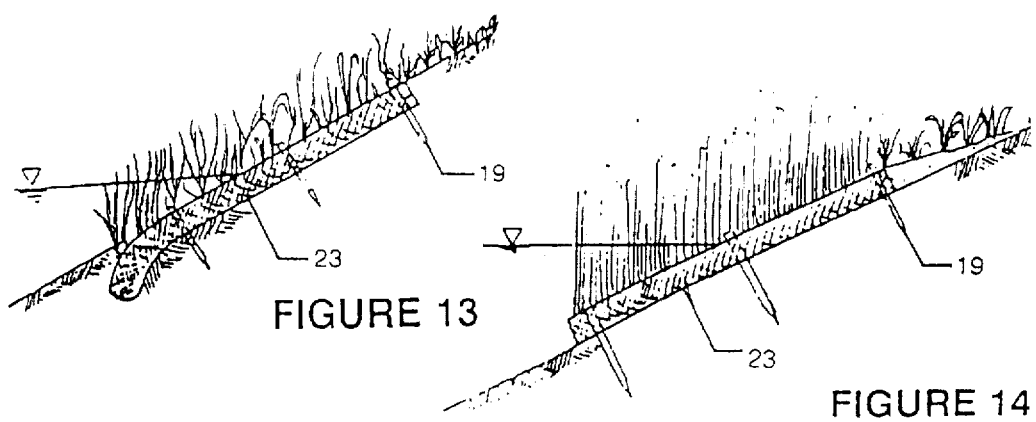
FIGURE 13
FIGURE 14

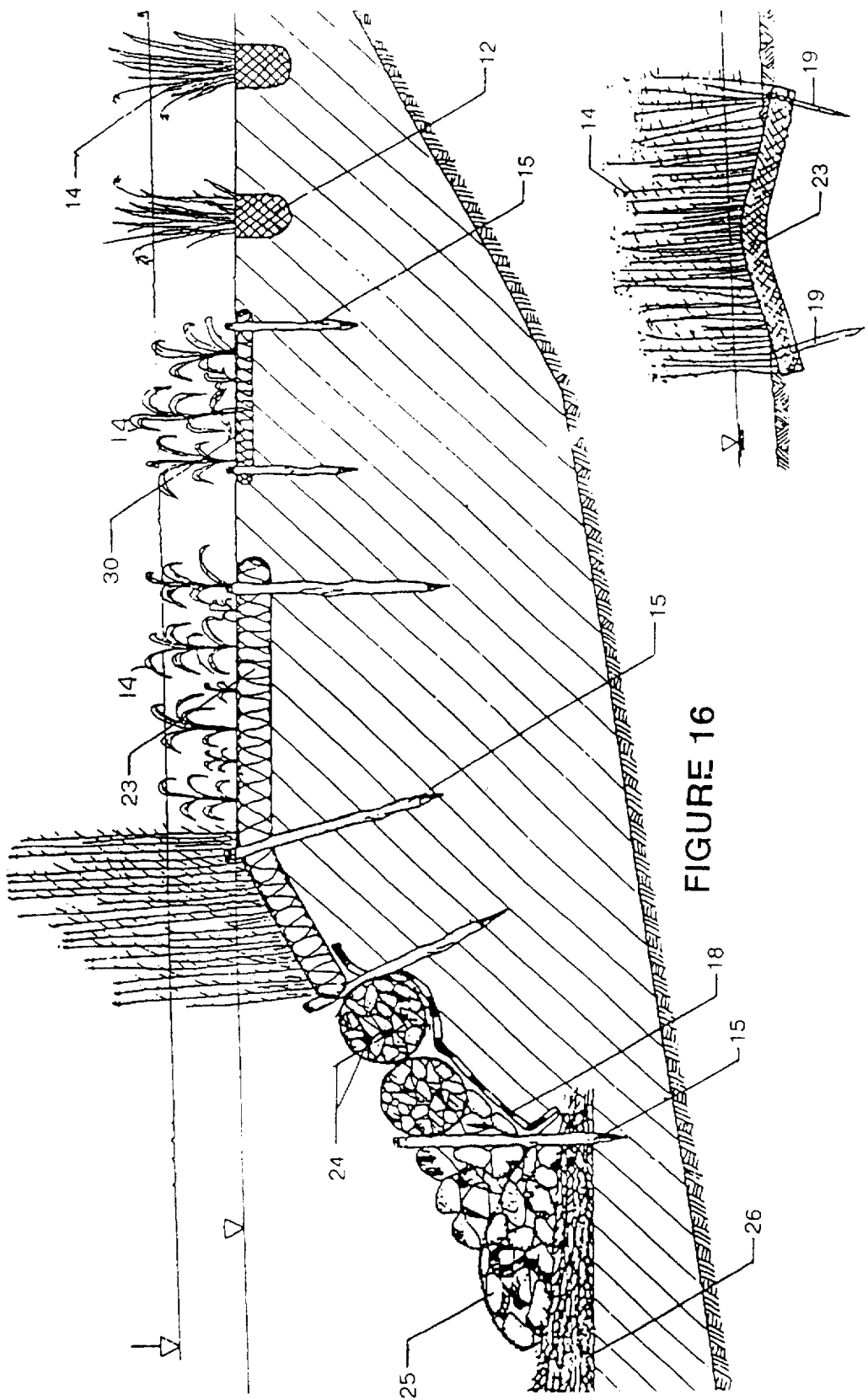

ECOLOGICAL COIR ROLL ELEMENT AND SHORELINE PROTECTED THEREBY

REFERENCE TO PRIOR APPLICATIONS

This is a continuation application(s) U.S. Pat. No. 5,425,597 Ser. No. 08/225,584, filed May 10, 1994, which application is a divisional application of U.S. Ser. No. 08/043,272, filed Apr. 6, 1993, now U.S. Pat. No. 5,338,131, issued Aug. 16, 1994, which patent is a contination-in-part of U.S. Ser. No. 07/886,693, filed May 21, 1992, now abandoned, which application claimed priority of European patent application Serial No. 92 105 015.9, filed on Mar. 24, 1992, under 35USC119. This continuation application also claims priority of European patent application Serial No. 92 105 015.9, filed on Mar. 24, 1992, under 35 U.S.C. 119.

BACKGROUND OF THE INVENTION

Water transfers its dynamic forces to the surrounding shoreline or to the bottom of a body of water whenever currents or wave movements occur. Particles within water beds and shorelines are carried away and deposited elsewhere, resulting in sedimentation and erosion.

Attempts to halt sedimentation and erosion have thus far utilized construction materials to form pilings, retaining walls and sheet pilings. These were the elements of choice for stabilizing shapes and positions of ocean, lake and river shorelines. However, such construction elements used alone were neither in harmony with nature nor long-lived.

In the more recent past some efforts were made to utilize seeds for stabilizing embankments along dams and shorelines. However, germination could only occur during certain seasons of the year and only under the most favorable conditions. Such seeds rarely germinated in sufficient numbers to provide reliable vegetative growth.

What is needed is an approach for stabilizing and protecting shorelines that would use ecologically compatible vegetative growth with structurally reinforcing construction materials in a variety of arrangements to accommodate different topographies.

SUMMARY OF THE INVENTION

The present invention relates to an arrangement for shoreline construction, maintenance, and protection, processes of preparation and methods of use of the same. In particular, the invention concerns plant plugs and fiber rolls-as ecological-botanical elements implanted among construction materials, processes of arrangement and methods of use for preventing shorelines erosion.

In one embodiment, plant plugs consisting of at least two precultivated, emergent aquatic plants have their roots contained within a bidegradable, water-permeable vegetative carrier. Such plant plugs are placed within riprap on shores to maintain shoreline positions.

Another embodiment comprises plant plugs and fiber rolls appropriately placed on a shore to provide protection for the shore. Fiber rolls include decaying fibrous material with precultivated, emergent aquatic plants rooted within the fibrous material. Fiber rolls are placed at high or low water marks with plant plugs placed among riprap higher or shore to provide protection from erosion. Another embodiment utilizing fiber rolls in combination with sheet pilings includes a positioning ballast body connected to a supportive buoyancy body, in turn affixed to a fiber roll, thereby forming a floatable device. Such a device is then flexibly attached to a sheet piling. These floatable devices can serve as docks particularly in areas of varying water levels.

Other embodiments include plant carpets and plant pallets. Plant carpets include precultivated emergent aquatic plants arranged and secured by ropes and stakes during an initial rooting period to form carpets. The carpets can be rolled and used to cover large areas of shoreline. Plant pallets comprise precultivated, emergent aquatic plants arranged within an outer wrapping of netting. Such pallets can thickly cover large shoreline areas where needed. Plant carpets and plant pallets may each be attached to one another to form large ecological-botanical elements secured to shorelines by construction materials.

Other arrangements of fiber rolls include dam formations in which pilings are inclined at such angles so as to form an open-ended trapezoid containing a fiber roll on top of layers of brush. On steep shorelines, successive pilings of fiber rolls are placed on a submerged bag of stones held in position by pilings. On shallow shores, a single fiber roll is secured by a surrounding net held in place by pilings.

Any number of arrangements is possible using ecological-botanical elements that include precultivated, emergent aquatic plants in combination with construction materials.

BRIEF DESCRIPTION OF THE DRAWINGS

FIG. 4 is an oblique perspective view of a preferred embodiment of fiber rolls;

FIG. 5 is a top plan view of two fiber rolls joined by lacing;

FIG. 6 is a cross-sectional view of an embodiment for dam construction;

FIG. 7 is a cross-sectional view of an embodiment for shoreline protection;

FIG. 8 is a cross-sectional view of an embodiment for steep shoreline slopes;

FIG. 9 is a cross-sectional view of an embodiment for steep shoreline slopes;

FIG. 10 is a cross-sectional view of an embodiment for use with sheet piling construction materials;

FIG. 12 is a cross-sectional perspective view of the embodiment of the subject invention;

FIG. 13 is another cross-sectional perspective view of the embodiment FIG. 12;

FIG. 14 cross-sectional view of still another embodiment of the subject invention;

FIG. 15 is a cross-sectional view of still another embodiment of the subject invention;

FIG. 16 is a cross-sectional view of the same embodiment of FIG. 15 in combination with other embodiments;

DESCRIPTION OF THE EMBODIMENT

Figure 1:
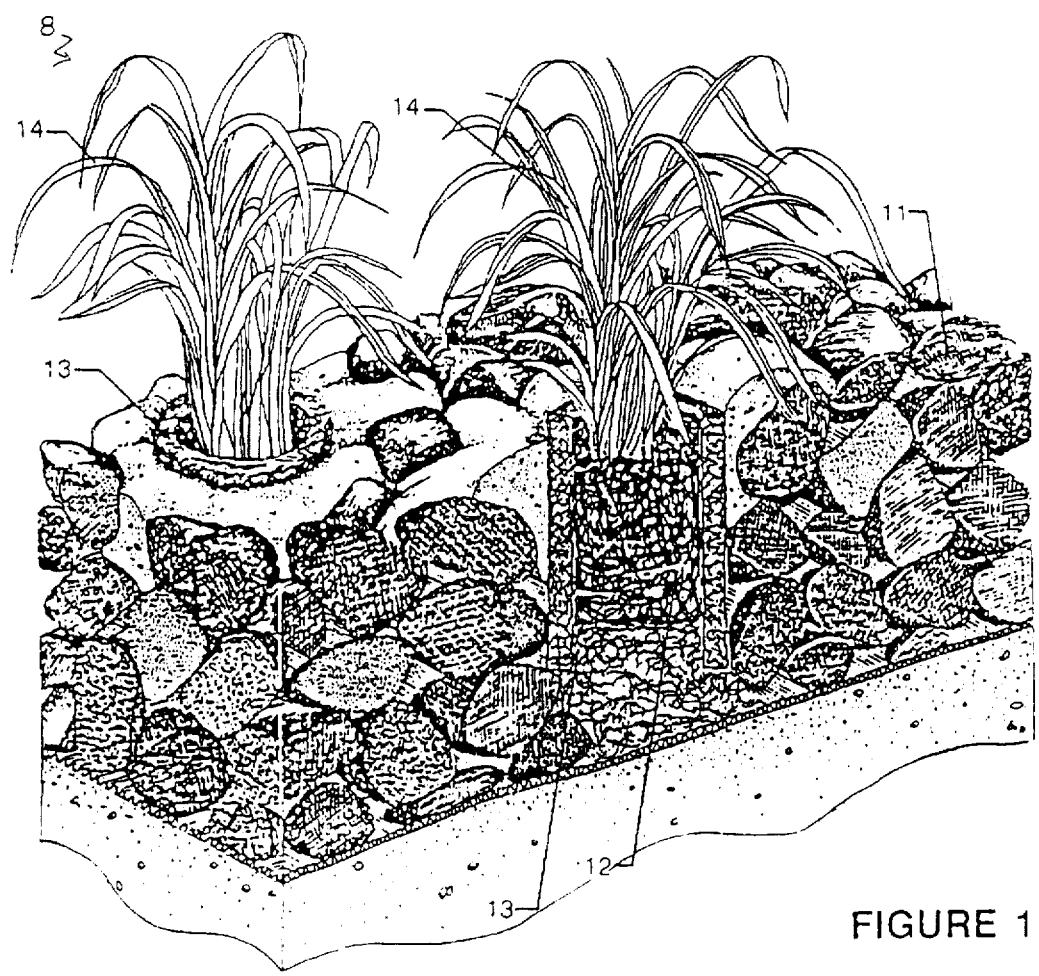
FIG. 1 is an oblique elevational perspective view of an embodiment of ecological-botanical elements of the subject invention.

Referring to the drawings in detail, an embodiment of an arrangement for shoreline construction maintenance and protection is shown and is generally designated by the reference numeral 8. (See FIG. 1.) The invention basically comprises a plant plug (12) including emergent aquatic plants (14) held within a vegetative carrier system (13). The plant plug (12) may contain from as few as two to as many plants as desired. The number of plants within a given plant plug (12) will vary with the species selected which, in turn, is determined by the shoreline area to be protected. Emergent aquatic plants (14) are precultivated to eliminate vagaries of seed propagation and germination and to allow desired placement.

A vegetative carrier system (13) made of a biodegradable, water-permeable substance is used to contain and protect the roots of the emergent aquatic plants (14) comprising the plant plug (12). The vegetative carrier system (13) provides ease of handling plant plugs (12) such as when placing plant plugs (12) into riprap (11) on a shoreline. (See FIG. 1.)

Figure 2:
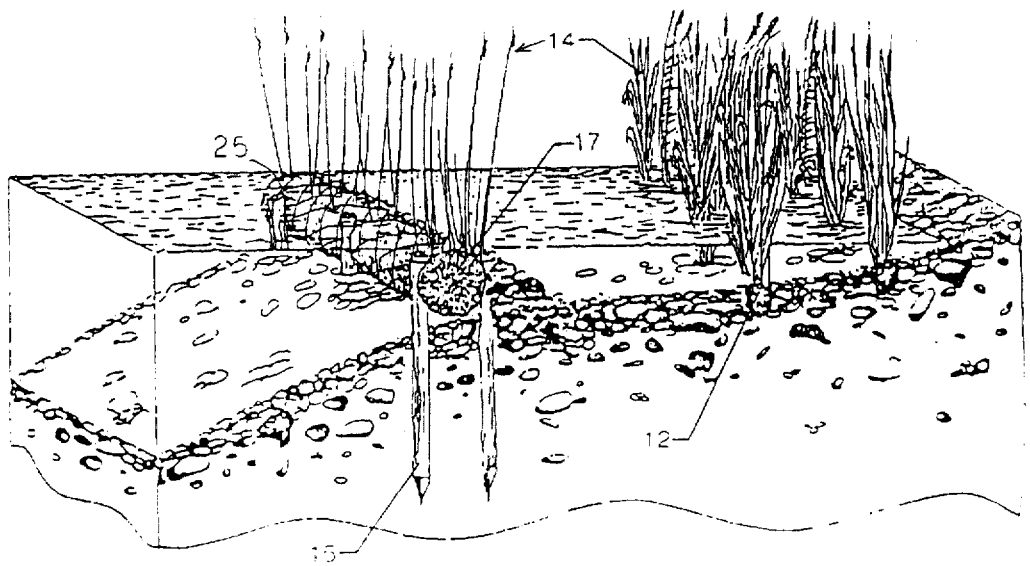
FIG. 2 is an oblique perspective view of another embodiment of ecological-botanical elements of the present invention.
Figure 3:
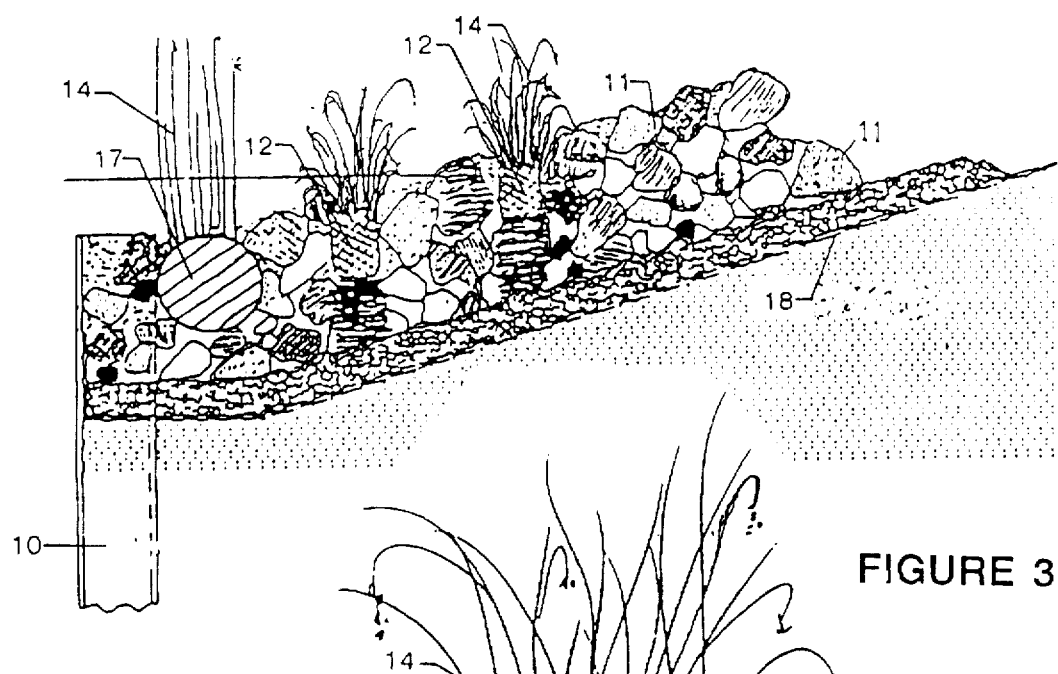
FIG. 3 is a cross-sectional view of an embodiment of FIG. 1.

As best shown in FIGS. 2 and 3, a second embodiment of the invention is the combined use of plant plugs (12) and fiber rolls (17) for shoreline maintenance and protection. Fiber rolls (17) comprise slowly decaying material such as coir held within a coarse mesh netting (25) into which are rooted precultivated emergent aquatic plants (14). Placement of fiber rolls (17) secured by pilings (15) close to an edge of a body of water and plant plugs (14) behind the fiber rolls provides shoreline protection especially at high or low water marks. (See FIGS. 2 and 3.) As shows in FIG. 3, a nonwoven filter (18) is used to underlay riprap (11) Where plant plugs (12) and fiber rolls (17) containing precultivated emergent aquatic plants (14) are placed within the riprap (11). Such an arrangement is often used in conjunction with a wall or sheet piling (10).

Figure 3A:
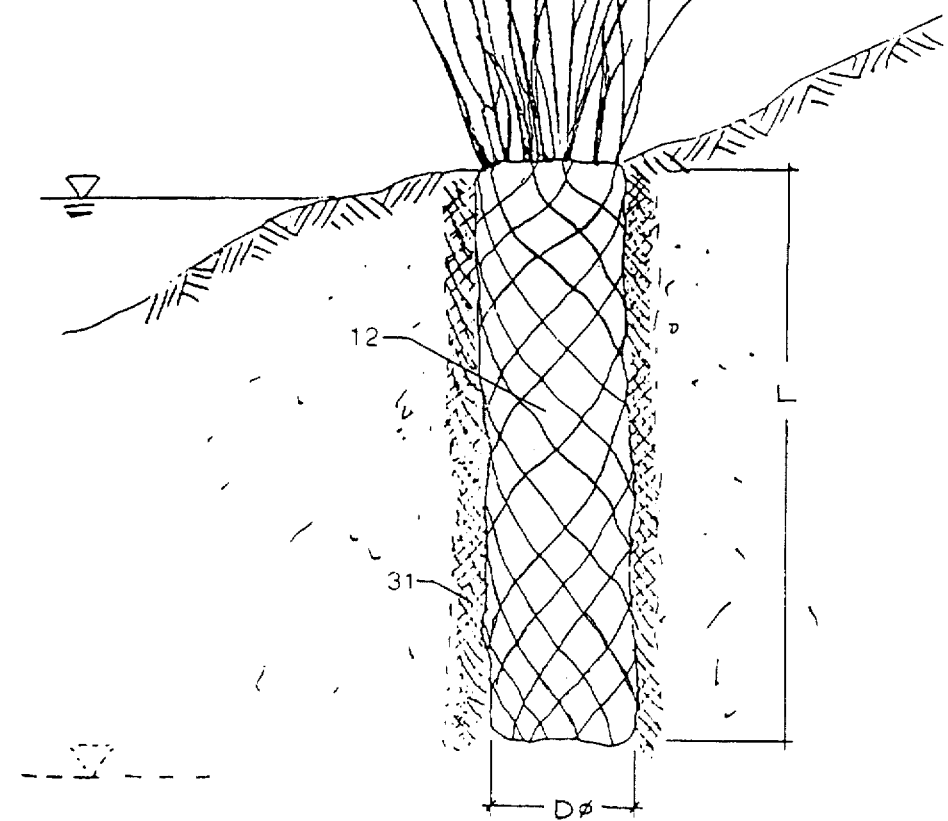
FIG. 3A is a cross-sectional view of an embodiment of a plant plug.

FIG. 3A shows an embodiment of the invention for shorelines that experience extremes of water level fluctuation. Here, where areas of shoreline may at times be too dry to support plant life, the use of plant plugs (12) having a bulb length, L, to bulb diameter, D, ratio or at least 1:1 and preferably 2:1 allows the precultivated emergent aquatic plants (14) to obtain water through capillary action at their roots. A substrate material (31) of choice may be used to surround the plant plug (12).

FIGS. 4 and 5 show arrangements for attaching fiber rolls (17) to one another. In FIG. 4, an outer netting (25) is used to hold two fiber rolls (17) adjacent to one another. The fiber rolls (17) are secured by means of pilings (15) driven into a shoreline. In FIG. 5, fiber rolls (17) are attached to one another by a netting material (25) laced between them.

FIGS. 6, 7, 8, and 9 show different possible arrangements for fiber rolls (17) to accommodate different shoreline contours. As Shown in FIG. 6, a vegetative off-shore dam is created by pilings (15) driven into a shoreline. The pilings (15) are inclined at angles to one another so as to form an open-ended trapezoidal shape. The trapezoidal shape is then filled with brush layers (26) and a fiber roll (17) securely fixed to the top of the brush layers (26). Similary, the shape of a shoreline can be maintained by placing a fiber roll (17) near the edge of the water and securing the fiber roll (17) in position by means of pilings (15). (See FIG. 7.) Sand and gravel may be layered over a non-wovan filter (18) and placed behind the fiber roll (17) to further assure its position. Where steep slopes occur at shorelines, multiple layers of fiber rolls (17) each secured by stakes (19) and pilings (15), are placed on top of a submerged bag of stones, also held in position by pilings (15).(see FIG. 8.) In contrast, where shorelines having gradual slopes and shallow waters occur, fiber rolls (17) secured by nets (20) and pilings (15) provide sufficient protection for maintenance.

Figure 11:
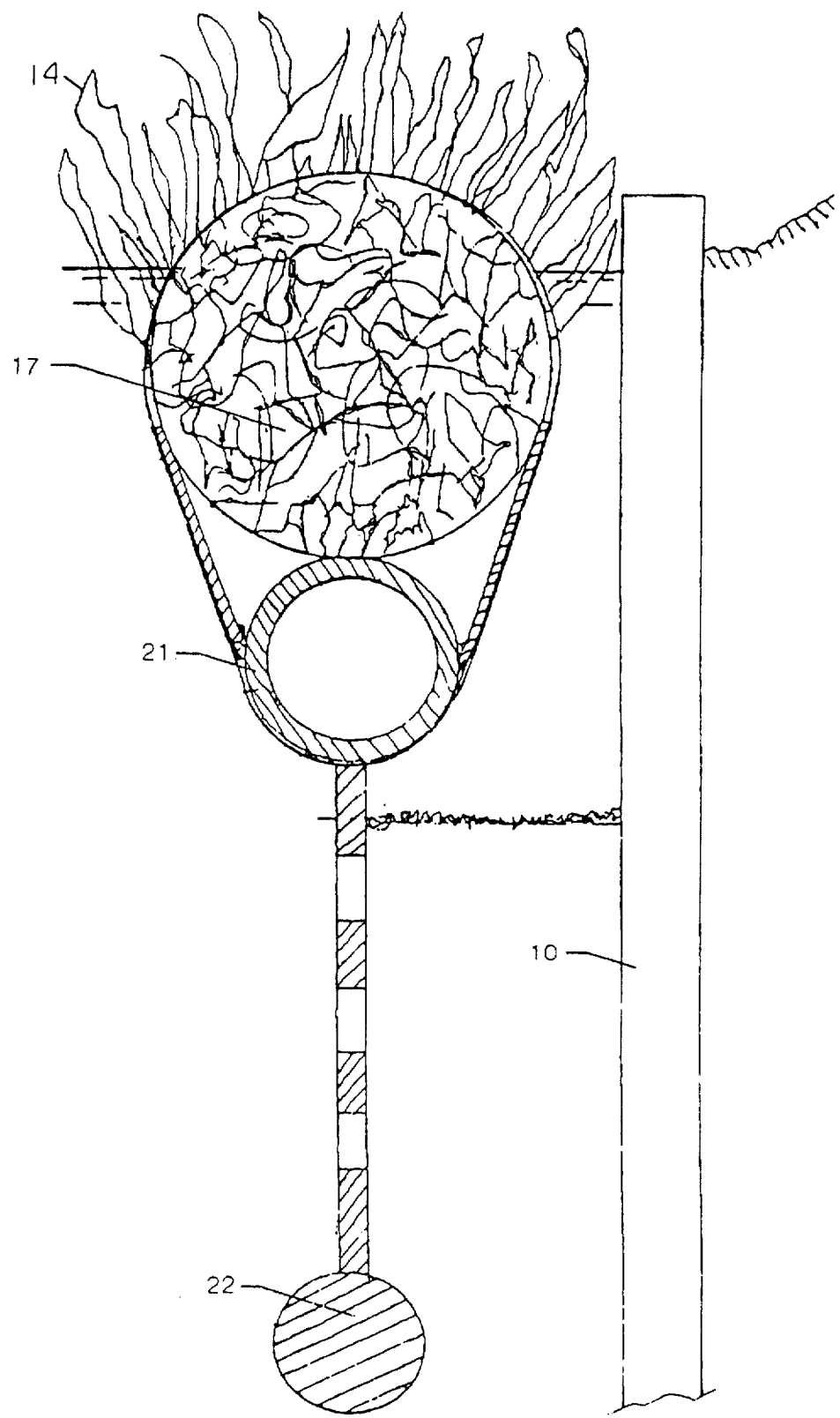
FIG. 11 is a cross-sectional view taken through a plane 11—11 of FIG. 10.

As seen in FIGS. 10 and 11, another embodiment comprises a sheet piling (10) retaining plant plugs (12), and fiber rolls (17) implanted among riprap (11) layered onto a non-woven filter (18) on a shoreline. Unique to this embodiment is a fiber roll (17) constructed as a floating element for adaptation to changes in water levels. A fiber roll (17) is affixed to a supportive buoyancy body (21) which, in turn, is attached to a ballast body (22). The fiber roll (17) floats as is the surface of the water and the ballast body (22) stabilizes the position of the fiber roll (17). A flexible fastener provides arrangement between the sheet piling (10) and the fiber roil (17), buoyancy body (21), and ballast body (22) in order to maintain a positional arrangement between the fiber roll (17) relative to the sheet piling (10).

FIG. 12 shows an embodiment of a plant riprap (23). The plant riprap (23) includes outer thick layers of biodegradable non-woven felt (27) on three of its four sides and an inner substrate (29) containing precultivated, emergent aquatic plants (14). A humus-free gravel substrate is the substrate of choice though other substrates may be used. A non-woven geotextile (28) is placed Over the substrate to prevent washing away of the substrate (29) and the precultivated, emergent aquatic plants (14) from the plant riprap (23). A nylon non-woven geotextile (28) is preferable although any geotextile would be acceptable for use in this arrangement. The total plant riprap (23) is surrounded by netting (25) to retain a desired shape. As seen in FIG. 12, a number of plant ripraps (23) may be connected to provide larger areas of coverage.

FIGS. 13, 14, and 15 show still other embodiments of plant ripraps (23). A plant riprap (23) may be secured to a sloping shoreline by stakes (ka) as shown in FIGS. 13 and 14, and may also be used to form a submersed dam held in place by stales (19) as shown in FIG. 15.

Figure 18:
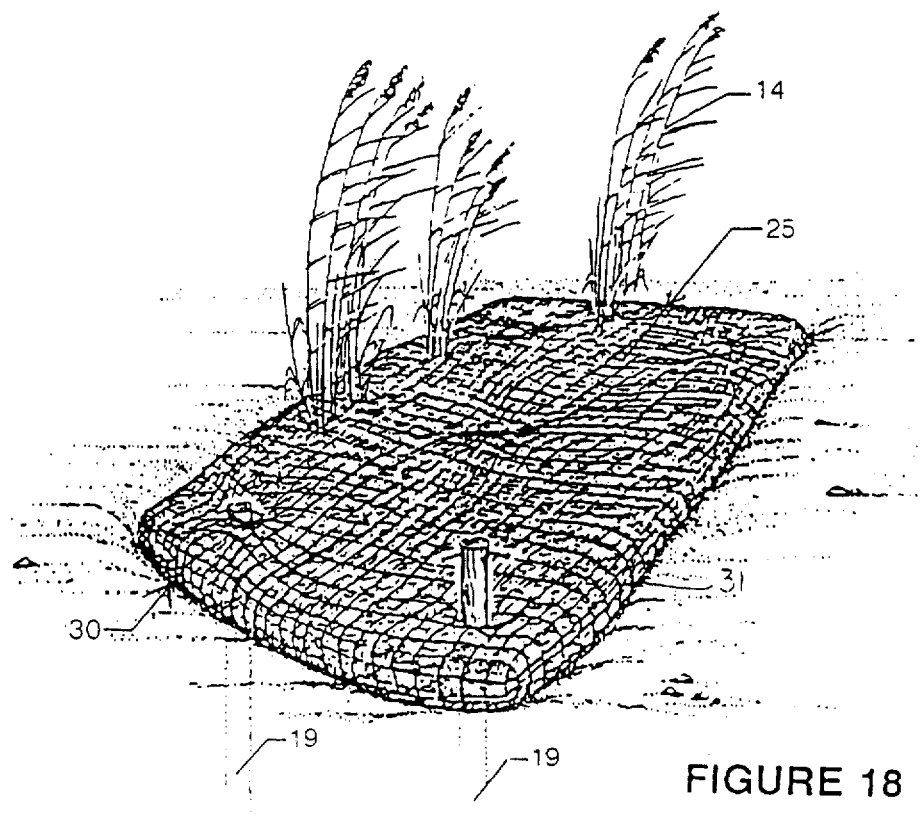
FIG. 18 is an oblique elevational view of the same embodiment of FIG. 17.

FIG. 16 best shows a use of a combined variety of ecological-botanical vegetative carrier systems with construction materials to prevent erosion of a shoreline having multiple topographical features. A layer of stone secured by netting (25) overlies an underwater brush layer (26). A non-woven filter (18) is placed on a sloping portion of the shoreline adjacent to the brush layer (26) and a layer of rock rolls (24) secured by pilings (15) is layered over the non-woven filter (18). Adjacent to the rock rolls (24) and non-woven filter (18) is placed a plant riprap (23) which is secured to the shore by pilings (15). Higher on the shoreline are placed plant pallets (30) also held in place by pilings (15), and plant plugs (12). Plant plugs (12), plant pallets (30), and plant ripraps (23) all contain precultivated, emergent aquatic plants (14). As best shown in FIG. 18, a plant pallet (30) comprises precultivated emergent aquatic planes (14) within a substrate (31) surrounded by an outer wrapping of netting (25). Plant pallets (30) preferably range in width from 0.8 to 1.25 meters and have thicknesses of 4 centimeters or more. Various dimensions can be made to accommodate different shoreline topographies. Plant pallets (30) are usually held in position on a shoreline by stakes (19).

Figure 17:
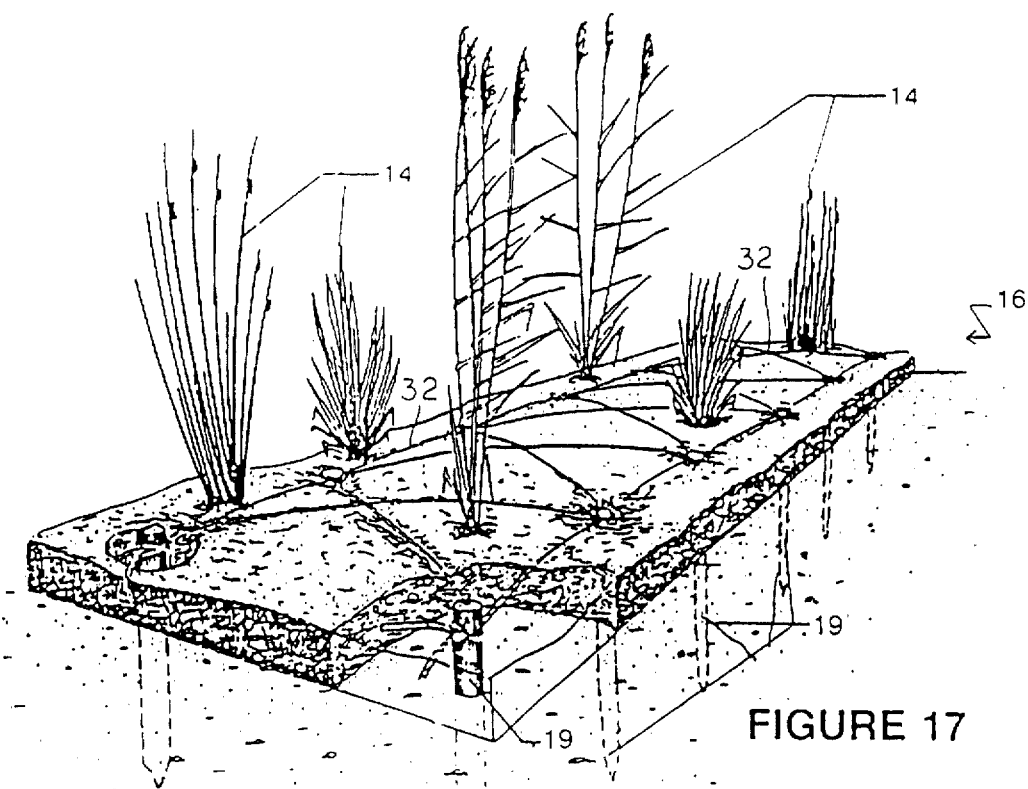
FIG. 17 is an elevational perspective view of still another embodiment of the present invention.

FIG. 17 shows a plant carpet (16) as yet another embodiment. Plant carpets (16) are formed of precultivated, emergent aquatic plants (14) secured during their initial rooting period by ropes (32). With growth, the roots of the precultivated, emergent aquatic plants (14) merge with one another to form plant carpets (16). Preferred widths for plant carpets (16) range from 0.5 to 0.2 meters for ease of rolling and handling. However, any dimensions desired can be achieved by appropriate arrangement of precultivated, emergent aquatic plants (14) at the initial period of growth.

What is claimed is:

1. An ecological fiber roll element adapted for use in the protection of a shoreline characterized by a high and low water line and to prevent erosion, which element comprises:
   a) an elongated, cylindrical fiber roll having a first and second end, and consisting essentially of slowly decaying, biodegradable, fibrous coir material; and
   b) a mesh netting material extending about the exterior peripheral cylindrical surface of said fiber roll and to hold within the said fiber roll of coir material.

2. The element of claim 1 which includes a plurality of precultivated, emergent, aquatic plants having roots which are planted and protected within said coir material.

3. The element of claim 1 wherein said roll comprises a generally tubular roll having a first and second end with an aquatic plant positioned within and extending outwardly from said first end and said second end adapted to be placed in the ground.

4. The element of claim 2 wherein said aquatic plants are generally aligned longitudinally and extend radially outwardly of said roll element.

5. The element of claim 2 wherein the aquatic plants have a bulb length, L, to bulb diameter, D, ratio of at least 1:1.

6. The element of claim 1 which includes a plurality of rolls arranged generally longitudinally adjacent and parallel to each other and includes means to secure said rolls together.

7. The element of claim 6 wherein the means to secure said rolls together comprises netting laced between said rolls.

8. In combination, a shoreline having one or a plurality of the fiber rolls of claim 1 and means to retain the fiber rolls in position on the shoreline.

9. The element of claim 7 wherein the means to secure said rolls comprises netting interwoven with the peripheral netting material of said rolls.

10. The element of claim 1 which includes a supportive buoyant body secured to said fiber roll to permit floatation of said roll.

11. The element of claim 10 which includes a ballast body connected to the buoyant body to stabilize said roll in the water.

12. The roll of claim 10 which includes a flexible fastener means to secure the fiber roll, buoyancy body and ballast and to permit attachment in an arranged shoreline position.

13. In combination:
   a) a plurality of pilings inclined at an angle and driven into the ground to form an open-ended trapezoidal body;
   b) layers of brush within the trapezoidal body; and
   c) the fiber roll element of claim 1 on top of the layers of brush.

14. In combination, a shoreline having a steep slope which includes:
   a) a plurality of first pilings in the shoreline;
   b) a submerged layer of stones held in place with the pilings;
   c) multiple layers of the fiber roll elements of claim 1 on top of the layer of stones; and
   d) stakes to retain the fiber roll elements in position.

15. In combination, a shoreline which comprises:
   a) one or a plurality of fiber roll elements of claim 1 near the edge of the high or low water line;
   b) means to secure the elements in position;
   c) a sand and gravel layer behind the elements; and
   d) a non-woven filter material placed beneath the sand and gravel layer and the elements.

16. In combination, a shoreline having a slope with a plurality of fiber rolls of claim 1 secured thereon for protection against erosion of said shoreline, and means to secure said fiber rolls.

17. An ecological fiber roll element adapted for use in the protection of a shoreline characterized by a high and low water line, which element comprises:
   a) a generally solid cylindrical roll having a first and second end and an elongated, longitudinal body, consisting essentially of biodegradable, slowly decaying fibrous coir material;
   b) a plurality of precultivated emergent aquatic plants having roots which are planted within the coir material; and
   c) mesh means to secure and hold the coir material in roll form.

18. The element of claim 17 wherein the means to secure comprises a coarse mesh netting material wrapped only about the cylindrical peripheral surface of said roll.

19. In combination, a shoreline with a plurality of rolls of claim 17 arranged generally adjacent each other and parallel to the slope of the shoreline, for protection against erosion of said shoreline; and means driven into the ground to secure the plurality of roll elements in position.

20. A shoreline having a steep slope and subject to erosion, which shoreline comprises:
   a) a submerged bag of stones along the shoreline;
   b) pilings to retain the bag of stones in submerged position on the shoreline;
   c) multiple layers of the fiber roll elements of claim 1 generally parallel to the shoreline and placed on top of the submerged bags of stones; and
   d) stake means to retain the fiber roll elements in position.

21. The shoreline of claim 20 wherein the fiber roll elements comprise a plurality of precultivated emergent aquatic plants within the fibrous coir material of said fiber roll elements and extending generally radially from each fiber roll element.

22. A shoreline having a graded slope and where shallow water occurs, which shoreline comprises:
   a) a plurality of fiber roll elements of claim 1 positioned on and generally parallel to the shoreline;
   b) net means about the fiber roll elements to secure the fiber roll elements in position; and
   c) pilings to secure the net means to the shoreline.

23. The combination of claim 8 which includes rip rap material positioned on the shoreline and the fiber roll elements secured and dispersed among the rip rap material to prevent, in combination, shoreline erosion.

24. A shoreline characterized by a low and a high water line and subject to water erosion, which shoreline includes:

a) a plurality of ecological fiber roll elements arranged and adapted on the shoreline to prevent erosion;

b) the fiber roll elements comprising an elongated, generally cylindrical, solid fiber roll having an exterior peripheral surface, the fiber rolls consisting essentially of slowly decaying vegetative, biodegradable, fibrous coir material;

c) the fiber roll elements having a netting material about the exterior peripheral surface to hold the coir material in roll form;

d) one or more precultivated aquatic, emergent aquatic plants rooted generally longitudinally along the fiber roll element; and e) means to secure the fiber roll elements in position on the shoreline between the high and low water line.

25. The shoreline of claim 24 which includes rip-rap material and the fiber roll elements secured within or about the rip-rap material.

26. The shoreline of claim 24 which includes a plurality of plant plugs dispersed and planted on the shoreline.

27. The shoreline of claim 24 wherein the means to secure comprises a plurality of stakes driven into the ground of the shoreline.

* * * * *